United States Patent [19]

Hanna

[11] 4,277,076
[45] Jul. 7, 1981

[54] STABILIZING VEHICLES

[76] Inventor: Clinton R. Hanna, 2756 N.E. 37th Dr., Fort Lauderdale, Fla. 33308

[21] Appl. No.: 47,792

[22] Filed: Jun. 12, 1979

[51] Int. Cl.³ .............................................. B60G 11/30
[52] U.S. Cl. ................................ 280/112 A; 280/772; 280/708
[58] Field of Search ........... 280/708, 111, 689, 112 R, 280/112 A, 772

[56] References Cited
U.S. PATENT DOCUMENTS

| 2,849,225 | 8/1958 | Lucien | 280/708 |
| 4,143,925 | 3/1979 | Young | 280/112 A |

Primary Examiner—Joseph F. Peters, Jr.
Assistant Examiner—John A. Carroll
Attorney, Agent, or Firm—Hymen Diamond

[57] ABSTRACT

A vehicle with soft hydropneumatic suspension of the body from the wheel base including facilities for suppressing roll-out on turns without binding free independent movement of the wheels. The roll-out is suppressed by the cooperation of a pendular hydraulic controller mounted on the body and hydraulic actuators, which suspend the body resiliently from the wheel base, and the spring accumulator of the hydropneumatic suspension. Pressure is supplied to the accumulator and to the actuators from an hydraulic power source. The actuators exert a force couple on the body. The pendular controller has a pendulum which, responsive to the movement of the body, reacts in the controller so that the controller varies the couple produced by the actuators in such a sense and with such magnitude as to suppress roll-out on turns. The actuators also provide integral leveling or height control of the body.

A significant feature is that one of the actuators has a pair of pressure chambers and the other, only one chamber. The force couple is exerted by the force produced by the pressure in one of the pair of chambers and in the one chamber. Integral leveling is provided by the forces exerted by the pressure in the other of the pair of chambers and in the one chamber.

14 Claims, 6 Drawing Figures

STABILIZING VEHICLES

BACKGROUND OF THE INVENTION

This invention relates to stabilizers for vehicles and has particular relationship to stabilizers of the type having a hydropneumatic suspension. Among the vehicles which have a hydropneumatic suspension are the Citroen. It is anticipated that the Mercedes Benz will also have hydropneumatic suspension. The hydropneumatic suspension suspends the body from the wheel base. Such a suspension includes a spring accumulator; a body having chambers separated by a membrane. In one chamber an hydraulic liquid is injected; in the other there is gas whose pressure counteracts the pressure of the hydraulic liquid.

At the outset it appears desirable to define several of the expressions used in this application. A vehicle is said to have an unsprung mass and a sprung mass. The unsprung mass is predominately the axles of the vehicle or other support of its wheels and the parts rigidly secured to the axles or to this other support. The sprung mass is the body of the vehicle and the parts connected thereto. The sprung mass is resiliently suspended from the unsprung mass. The "ends" of a vehicle or of the sprung mass are the front end and the rear end of the vehicle or the sprung mass. The corners of the vehicle or sprung mass are at the terminals of the ends. The expression "opposite corner" means the corner at the same end as the reference corner or the corner diagonal to the reference corner.

This invention concerns itself with anti-roll stabilization. In accordance with the teachings of the prior art, there have been provided anti-roll or banking devices which operate in combination with power-operated inertia stabilizers. Such devices which have been marked by technical success and have been provided by the inventor whose invention is disclosed in this application and by others. Such anti-roll devices are complicated and demand excessive quantities of hydraulic power, an undesirable property in the light of the current energy shortage.

With the advent of the hydropneumatic suspension in Europe about twenty years ago, excellent vertical-ride performance equivalent to that of the inertia power stabilizer was achieved. However, vehicles equipped with such suspensions have excessive roll on turns. To overcome this deficiency a very stiff roll torsion bar was included. This added high stiffness for roll but none for vertical movements. The roll bar has not proven satisfactory because it severely impedes individual movement of the wheels.

It is an object of this invention to overcome the disadvantages, deficiencies and drawbacks of the prior art.

It is also an object of this invention to provide, in a vehicle having soft hydropneumatic suspension, facilities having low power consumption to prevent roll-out on turns which shall operate without binding the free independent movement of the wheels of the vehicle.

It is another object of this invention to provide, for a vehicle including a hydropneumatic suspension, anti-roll means which shall impress great anti-roll forces in a simple manner. Another object is to provide proper damping means for the vertical and angular modes of both sprung and unsprung masses of a vehicle with such anti-roll means. A further object is to provide in such a vehicle integral leveling or height control of the sprung mass to accomodate changes in loading with uniform time delay of such leveling. Still another object is to provide an anti-roll hydropneumatic suspension means with only three working pressure chambers. Yet another object is to provide for such anti-roll means a pendular-valve system with very high speed of response and with damping means for the pendulum having linear characteristic independent of the fluid viscosity. An important object of the invention is to provide a pendulous anti-roll device for a vehicle including hydropneumatic suspension in which a pendulum has a large radius of gyration with great moment of inertia and small pendulous height. Another object is to provide a vehicle including a hydropneumatic suspension with anti-roll means, a positive mechanical lock-out to prevent body sag when the hydraulic power source is idle. An important object is to present a very soft hydropneumatic suspension system with powerful anti-roll means, but whose power consumption is comparable to that of present passive shock absorbers.

SUMMARY OF THE INVENTION

In accordance with this invention substantially flat cornering of a vehicle, without the offensive torsion roll bars, is attained by cooperation of pendular hydraulic roll-out restraint and the hydropneumatic suspension. The roll-out restraint is achieved together with level control by hydraulic actuators whose pressure is controlled by a pendular controller. One actuator suspends the sprung mass from the unsprung mass, resiliently, in dependence upon its pressure, near one corner of the sprung mass. Another actuator likewise suspends the sprung mass from the unsprung mass near the opposite corner of the sprung mass. A feature of this invention which results in simplification of the apparatus is that the actuators are unlike. One has two chambers: a first whose pressure exerts an upward force and a second whose pressure exerts a downward force. The other actuator has a chamber whose pressure exerts only an upward force. This invention in part arises from the realization that the forces exerted by the pressure in the second chamber and in the chamber of the other actuator form a force couple whose magnitude can be set by the pendular controller so that the couple counteracts the tendency of the sprung mass to roll on turns. The pressure in the first chamber and in the chamber of the other actuator can be set to achieve leveling of the sprung mass.

Pressure from an hydraulic power source of the hydropneumatic system of the vehicle under the control of a pendulum and valve arrangement of the pendular control is applied to hydraulic actuators of the suspension in such a way as to resist roll of the vehicle body with the use of very little power. Automatic leveling or height control is also achieved.

This anti-roll apparatus consumes relatively low power. It operates without impeding individual movement of the wheels.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENTS

The apparatus shown in FIGS. 1 through 5 includes a vehicle V (FIG. 1) having a sprung mass S and an unsprung mass U. This apparatus includes an hydraulic power source 101 energized from the engine of the vehicle V by a belt drive (not shown). There is also an hydraulic actuator 1 and an hydraulic actuator 9, a spring accumulator 4, a pendular controller 6 and a mechanical lockup 29. The spring accumulator 4, the pendular controller 6 and the power source 101 are mounted on the sprung mass S. The actuators 1 and 9 are interposed between the sprung mass S and the unsprung mass U and provide a resilient suspension for the sprung mass S. The mechanical lockup 29 is suspended from the sprung mass S and is engageable with and disengageable from the unsprung mass U as the power source 101 is disabled or enabled.

The hydraulic power source 101 (FIG. 3) includes a pump 34 which is in communication with a sump 38. There is also an accumulator 35 not to be confused with the accumulator 4. The accumulator 35 may be of generally spherical or cylindrical shape and includes compartments 107 and 109 separated by a flexible membrane 111. The compartment 109 has a hollow stem 113. The pump 34 is connected to the compartment 109 through a check valve 36 and through the stem 113. A high pressure conductor 13 is interposed between the check valve 36 and the stem 113. A liquid, typically a light oil, is transmitted through conductor 13 at high pressure to the cooperative assembly including accumulator 4, pendular controller 6, and actuators 1 and 9 and the sump 38. The liquid is returned to the sump 38 through the main return 103 and the auxiliary or separate return 105. The separate return 105 from the casing 115-117 (FIG. 2) is of smaller diameter or bore than the main return 103. Flow through the separate return 105 avoids the pulsating changes which occur in the main return 103. The mechanical lockup 29 (FIGS. 4, 5) is supplied from the pump 34 through conductor 39 (FIG. 3) which is interposed between the pump 34 and the valve 36. When valve 36 is closed, liquid leaks back through orifice 37 C.R.H. to sump 38.

The spring accumulator 4 (FIG. 2) is similar to accumulator 35 and has compartments 108 and 110 separated by a flexible membrane 112. The accumulator 4 has a hollow stem 114 extending from compartment 110 through which liquid may be conducted in and out of compartment 110. The liquid in compartment 110 exerts pressure dependent on its quantity on the membrane 112. This pressure is counteracted by the gas pressure in compartment 108. The interaction of the liquid in compartment 110, the gas in compartment 108 and the membrane 112 imparts the properties of a spring to the accumulator 4.

The pendular controller 6 (FIG. 2) includes the casing defined by the flanged cap 115 of rectangular transverse section and a rectangular base 117. The base 117 has a central projection 119 of generally rectangular transverse section. This projection 119 serves as valve housing. The casing is formed between the cap 115 and the base 117, the flange 121 of the cap 115 extending around the rim of the base 117. A gasket 123 is interposed between the flange 121 and the base 117 to provide a liquid-tight seal for the casing. The projection 119 extends upwardly towards the top 125 of the cap 115 defining with the cap a compartment of generally downwardly extending longitudinal U section. A pendulum 10 is mounted oscillably in this compartment. The pendulum 10 includes masses 131 and 133 connected by cross member 135. The pendulum is suspended by the cross member 135 from a pivot pin P in a stem 137 extending from the projection 119. The suspension is through a ball bearing (not shown).

Figure 2:
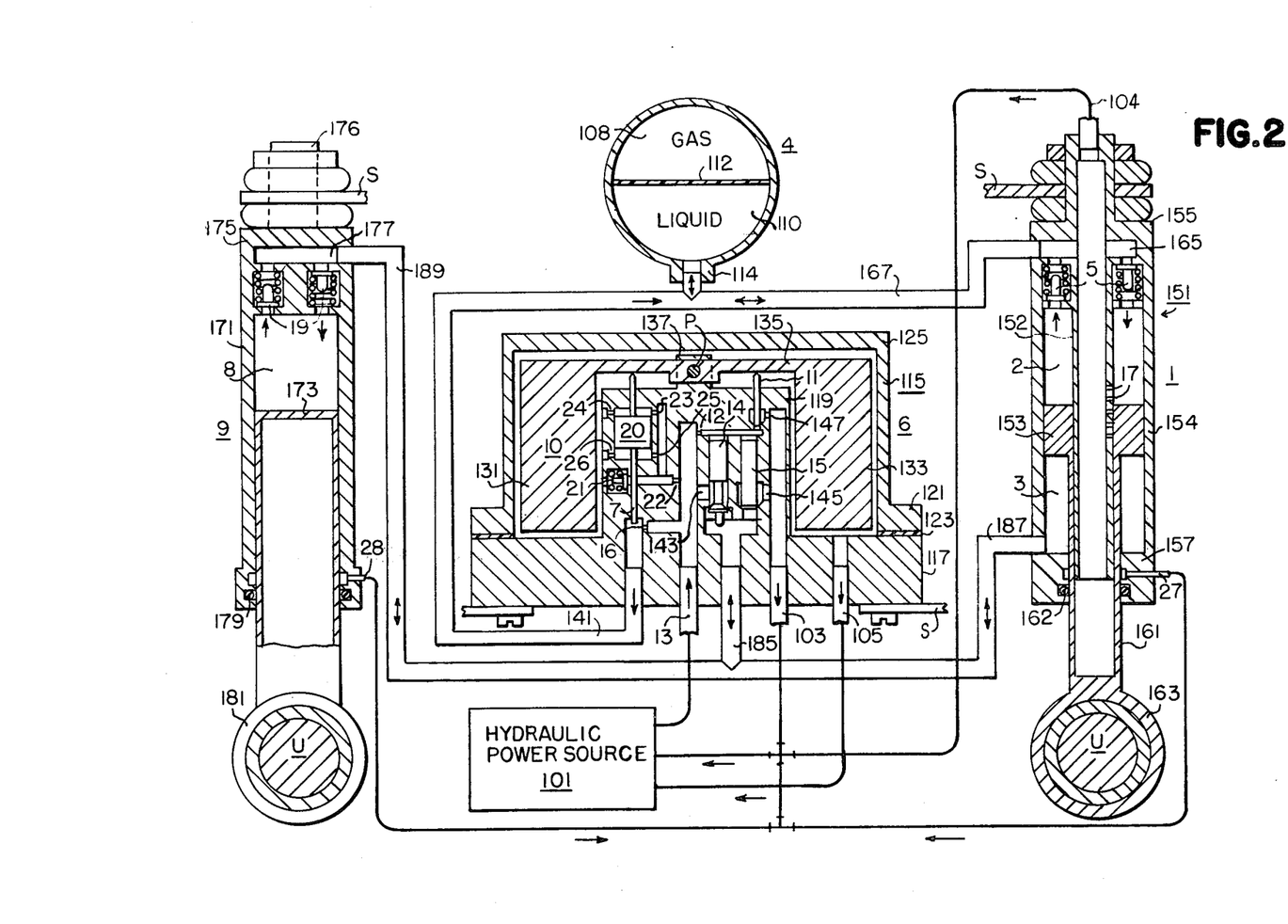
FIG. 2 is a view in longitudinal section showing a hydropneumatic suspension for this vehicle including pendular restraint of roll-out on turns of the vehicle and level control.

Within the projection or valve housing 119 there are provided a feed-back piston 7, a pilot valve 11, an inlet valve 14, and a discharge valve 15. The pilot valve 11 is actuable by the cross member 135 of the pendulum 10. When the pendulum pivots clockwise, the valve 11 is actuated towards the closed position; when the pendulum 10 pivots counterclockwise, the valve 11 is actuated towards the open position. The piston 7 is actuable at the lower end responsive to the pressure of liquid in conductor 141. It is actuable at the upper end, oppositely to the pressure of the liquid, by the cross member 135. The actuation in either direction is through dash pot 20. Liquid is supplied to the valve housing 119 from the hydraulic power source 101 through conductor 13 which is sealed liquid tight through base 117. The liquid flows into conductor 141 through orifice 16, into inlet valve 14 through opening 143 and to pilot valve 11 through orifice 12. Liquid flows into the pendulum compartment from conductor 13 through orifice 22 and valve 21 and through orifices 23, 24, 25 and 26. Valve 21 maintains a relatively low pressure, typically about 25 pounds per square inch, across pairs of orifices 23 and 24 and 25 and 26 which are in parallel. Discharge valve 15 is connected to return conductor 103, through opening 145. Pilot valve 11 is connected to return conductor 103 through opening 147. The pendulum compartment is connected to return conductor 105 and its liquid is not affected by the pulsations in conductors 13 and 103. Conductors 103 and 105 are sealed through base 117.

Actuator 1 includes an annular member 151 having an inner shell 152 and an outer shell 154 and having hollow closures 155 and 157 at the top and bottom. The top 155 has a stem by means of which the shell 151 is secured to the sprung mass S. Within the shell 151 piston 153 is slideable. The piston 153 divides the shell into a upper chamber 2 and a lower chamber 3. To accommodate the inner shell 152, the piston 153 is hollow and the piston rod 161 is hollow along its upper portion. The piston rod 161 is slideable through packing 162 in the lower closure 157 of the member 151. At its lower end the piston rod 161 carries a sleeve 163 by means of which it is connected to the axle of the vehicle V; i.e., to the unsprung mass U. The sleeve 163 permits rotation of the axle. Intermediate its ends the inner shell 152 has perforations 17 along the portion of its length along which the piston 153 is slideable. Depending on the position of the piston 153 none of the perforations 17 or any number of the perforations permit passage of liquid between chamber 2 and the inside of shell 152. The inside of shell 152 is connected to return conductor 104. The closure 155 includes a plenum 165. The plenum 165 is connected to the upper chamber 2 through damper valves 5. The plenum 165 is connected to the compartment 110 of the spring accumulator 4 through conductor 167. Liquid from the high-pressure conductor 13 is conducted to the spring accumulator 4 through orifice 16. Depending on the force exerted by the spring accumulator 4, liquid flows into or out of chamber 2 through damper valves 5, plenum 165 and conductor 167. The packing 162 is relieved by low-pressure return 27 to the conductor 103.

The actuator 9 includes a shell 171 and a piston 173 slideable in the shell 171. The shell 171 and the piston 173 define a chamber 8. The shell has a closure 175 at the upper end. The closure 175 has a stem 176 by means of which the shell 171 is secured to the sprung mass S. The closure 175 includes a plenum 177 which is connected to chamber 8 through damper valves 19. The piston 173 is slideable through packing 179 at the lower end of shell 171. At its lower end the piston 173 carries a sleeve 181 which engages the unsprung mass U, permitting rotation of the axle. The packing 179 is relieved by low-pressure return 28 to conductor 103.

The inlet valve 14 and the discharge valve 15 are connected in common to a conductor 185 which is sealed through base 117. The conductor 185 is connected at a T junction to chamber 3 through conductor 187 and through conductor 189 to chamber 8 through the plenum 177 and the damper valves 19. In the performance of valves 14 and 15, the liquid flows from conductor 13 into chambers 3 and 8 through inlet valve 14 or out of these chambers through discharge valve 15.

Under the weight of the sprung mass S, as its loading varies, the member 151 and the shell 171 are moveable relative to the pistons 153 and 173 respectively. The resilience of the liquid under the parts 151 and 171 is determined by the spring accumulator 4.

The mechanical lockup 29 (FIGS. 4, 5) includes a channel member 201 having a pin 203 at its lower end. There is also a bracket 205 welded to the sprung mass S. The channel member 201 is pivotal on a pin 30 extending between plates 209 secured to opposite edges of the bracket 205. Near the pin 30, the member 201 has recess 211. A compression spring 31 engages the recess 211 at one end and the opposite wall 213 of the bracket 205 at the opposite end urging the channel member 201 away from the wall 213. A cylinder 33 is mounted in the wall 215 of bracket 205 opposite the wall 213. A piston 217 is slideable in the cylinder 33. The outward end of the piston 217 engages the member 201 at the outer surface of recess 211. The pin 203 is engageable with and disengageable from a slot in a tab 32 extending from the casing 221 of the differential of the vehicle V.

Figure 3:
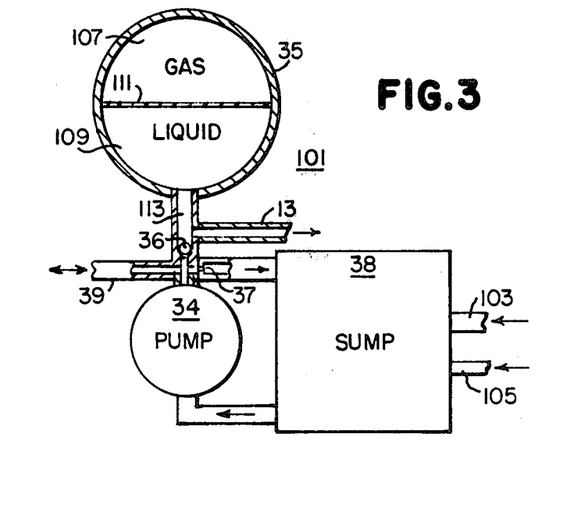
FIG. 3 is a fragmental diagrammatic view showing the hydraulic power source used in the practice of this invention.

The cylinder 33 is supplied from the conductor 39 (FIG. 3). With the pump 34 quiescent, the check valve 36 is closed and any fluid in cylinder 33 flows into sump 38 through conductor 39. Under the force of the spring 31, the pin 203 is urged into engagement with the slot of tab 32. The sprung mass S is then prevented from sagging. With the pump 34 in operation, the check valve 36 is open and the pressure of accumulator 35 is applied to cylinder 33. Piston 217 is moved outwardly counteracting the force of spring 31 and disengaging the pin 203 from tab 32 so that the sprung mass S is suspended from the actuators 1 and 9 under the influence of spring accumulator 4.

Figure 1:
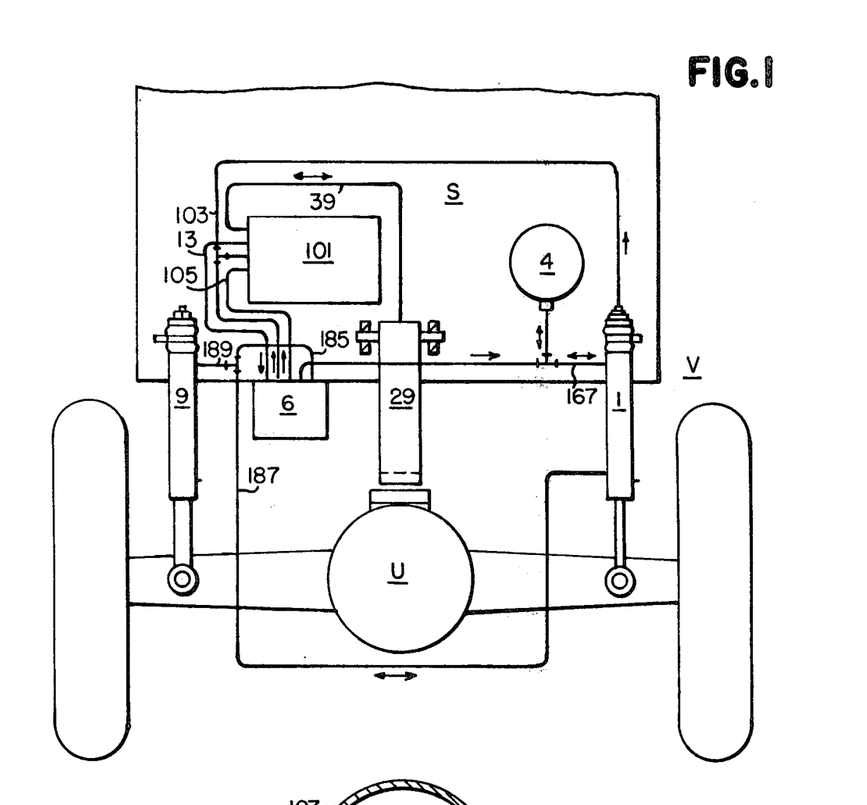
FIG. 1 is a view in rear elevation showing a vehicle in accordance with this invention.

In FIG. 1 the components which cooperate to restrain roll out are shown mounted on the rear end of the vehicle V. Conventional springing may be used at the front end where disturbances are further removed from passengers. The power source (FIG. 3) will ordinarily be comprised of an engine-driven pump 34 plus an accumulator 35 for storing liquid under pressure and a sump 38 for return of low-pressure liquid. The pendulous controller 6 mounted on the sprung mass of the vehicle as shown (FIGS. 1 and 2) determines an average pressure plus variations proportional to the lateral acceleration of the pendulum 10. The pilot valve 11 acted upon by the pendulous force and the force of the feedback piston 7 determines a pressure which is applied to the tops of the power inlet and discharge valves 14 and 15 which cooperate to determine a pressure commanding whether fluid is leaving or returning to the controller. The pilot valve 11 is fed from the high pressure power source 13 through the orifice 12. The controller output pressure bears a one-to-one relationship to the pilot valve pressure.

The hydraulic actuator 1 having two fluid pressure chambers 2 and 3 supports one corner of the vehicle with chamber 2 connected to the accumulator spring 4 having pressure to support twice the sprung weight at that corner. The controller 6 pressure whose average is slightly more than one-half the pressure of accumulator spring 4 is applied to pressure chamber 3 of the actuator 1 to yield a downward force equal to one-half the lift force of chamber 2. It is the feedback piston 7 acted upon by the pressure of accumulator 4 which determines the average pressure. The controller pressure is also applied to the single chamber 8 of the actuator 9 having area equal to that of chamber 3 to give the proper lift at the other corner of the vehicle. The double force upwardly produced by the pressure in chamber 2 is countered by half that force downwardly produced by the pressure in chamber 3. Typically:

Let
$A_2$ = Area of piston 153 in chamber 2 = 1.33333 in$^2$
$A_3$ = Area of piston 153 in chamber 3 = 1.2 in$^2$
$P_2$ = Pressure in chamber 2 = 1800 #/in$^2$
$P_3$ = Pressure in chamber 3 = 1000 #/in$^2$
Let
$F_2$ = Force exerted by pressure in chamber 2
$F_3$ = Force exerted by pressure in chamber 3
$F_2 = P_2 \times A_2 = 2400\#$
$F_3 = P_3 \times A_3 = 1200\#$
$F_2 - F_3 = 1200$ The area of piston 173 in actuator 9 is equal to the area of piston 153 in chamber 3; i.e.:

$A_8 = A_3 = 1.2$ in$^2$
$P_8 = P_3$
$F_8 = A_8 \times P_8 = 1200\#$

The pressures are set by the cooperation of piston 7, pendulum 10, and spring accumulator 4. When $P_2$ is less than 1800 #/in$^2$ because of lighter loading of the sprung mass, the above forces are proportionately reduced. For example assume:
$P_2 = 1200$ #/in$^2$
Then
$P_3 = 666.66$ #/in$^2$
$F_2 = 1600\#$
$F_3 = F_8 = 800\#$, $F_2 - F_3 = 800\#$ The ratio ($P_3/P_2$) or ($P_8/P_2$) = (5/9) and not (½) because $A_3$ is less than $A_2$. The ratio 5/9 is produced by setting the area of the feedback piston 7 at 5/9 of the area of the piston of pilot valve 11.

The damper valves 5 provide the usual shock-absorber damping, as in conventional hydropneumatic suspensions, when fluid flows to or from the spring accumulator 4. Valves 19, similar to valves 5, are provided for damping at actuator 9. These valves 19 are interposed between the chamber 8 and the controller 6. These can be designed to provide constant linear characteristic independent of fluid viscosity. With soft hydropneumatic springing (about 25#/in instead of the usual 100#/in with metal springs), the damping which is sufficient to prevent wheel hop at each wheel will yield almost dead beat performance for the body resonance (one-half cycle per second instead of the usual one cps.). The result is a tremendous improvement in passenger comfort, not only because of the reduced resonance but because the springing is so soft.

As the vehicle turns to the right, the pendulum 10 lags to the left (turns clockwise) about the pivot P to raise the controller pressure. This increases the lift at the actuator 9 and the downward force at the actuator 1 to prevent roll out of the sprung mass S. Similarly, as the vehicle turns to the left, the pendulum lags to the right (turns counterclockwise) to lower the controller 6 pressure to decrease the lift at the actuator 9 and the downward force at the actuator 1 to prevent the opposite roll out. Upon returning to a straight heading, the pendulum 10 force is reduced to zero and no roll moment is present and the vehicle body stays level.

The choice of hydraulic valving in controller 9 with which pressures are determined is of importance to the successful operation of this system. In the practice of this invention, seated or poppet valves are used rather than spool valves. With spool valves it would be possible to close off pressure chambers to impede roll of the vehicle body, but the movement of the wheels to accommodate road undulations would be impeded severely. In the practice of this invention pressures which match the roll tendency are produced but no locking of the wheels occurs. However, regardless of their disadvantage, apparatus including one or more spool valves in place of poppet valves are within the scope of this invention.

Leveling or height control of the vehicle body is integrally obtained by the actuator 1. Its upper chamber 2 together with the accumulator 4 are fed from the power source 13 through the orifice 16. Regulation of height is accomplished by covering or uncovering the several orifices 17 by the piston 153 to control the pressure in the chamber 2. If the body is too low because of heavy loading, more of the orifices 17 are covered and the pressure rises; if too high because of light loading, more of the orifices are open and the pressure falls. The flow of fluid from the orifices 17 passes to the sump of the power source through return 104. It is possible with this stepped arrangement to maintain uniform time delay of height control. Delays of 10 to 15 seconds are usual for this function. The single control of the actuator 1 serves both sides of the vehicle inasmuch as the feedback piston 7 assures equal force change at the actuator 9 when the average pressure of the accumulator 4 is changed.

The other important gain of this invention derives from the anti-roll features which allows free independent wheel movement (except for the needed damping) because the torsion roll bar can be eliminated. Nearly perfect flat cornering (zero roll out when turning) results with the apparatus according to this invention as contrasted to about 6° steady roll out with the offensive roll bar. The latter greatly disturbs both front and rear passengers when one wheel encounters a bump or chuck hole and largely defeats the advantage of soft springing because the usual torsion bar adds about 150 #/in stiffness at each wheel to which it is connected. For a better understanding of this advantage it should be realized that the roll torsion bar is a spring which adds no stiffness for vertical movements of the body or for collective vertical movements of a pair of wheels, but which adds the above approximate stiffness for reducing the roll with the severe penalty of binding individual wheel movement.

The pendulum 10 of the controller 6 desirably has small pendulous height and large radius of gyration. The radius of gyration may be made any desired large magnitude (within reasonable dimensional limits) by merely spreading the right and left mass components 131 and 133 of the pendulum 10. This is to minimize its response to angular acceleration of the body when its mounting is above the roll center of the vehicle. The sprung mass S is anti-pendular; its center of mass is above the roll center. With independent suspensions, the roll center may be close to the road surface and the mounting of the controller 6 on the body S is necessarily above this center. Response of the pendulum 10 to lateral accelerations caused by angular acceleration can be unstabilizing unless reduced. It can be shown that if the radius of gyration is k inches and the pendular height is h inches, then the mounting of the controller may be $k^2/h$ inches above the roll center with zero response to angular accelerations of the body. Since perfect correction is unnecessary, the above $k^2/h$ is the number of inches the controller will in effect be brought closer to the roll center when the mounting must be high. A correction of say six inches will take care of most cases. With solid rear axles the roll center is higher and mounting close to this center is feasible.

Dash-pot damping of the pendulum movements is provided at 20. This is done in such a way that linearity, free from temperature viscosity of the liquid is obtained. A low regulated pressure (about 25 psi) is obtained at the valve 21 preceded by orifice 22. The low pressure is applied to orifices 23, 24 and 25, 26 to cause steady flows of fluid for each chamber of the dash pot. As the piston moves the flow through one of the orifices for each chamber waxes while the other wanes to give a push-pull effect for linearizing the otherwise square law characteristic of the orifices. If all orifices are equal, then 12.5 psi appears at each side of the dash-pot piston to give near balance or zero force on the piston and the pendulum. The flow of fluid into the pendulum housing exits through the small separate return shown rather than through the main return to avoid the pulsating pressure changes of the latter.

For the vertical mode it is seen that the volumes of the chambers 3 and 8 change oppositely and so no flow of fluid to or from the controller 6 is required. There is therefore no power loss other than that for the shock absorber damping at the valves 5 and 19. If the right wheel moves, the pressure change in the accumulator spring 4 causes a proportional change through the feedback piston 7 in the controller pressure with the result that equal changes in the force at the two actuators occur. The result is parallel movement of the body. If only the left wheel moves, there will be no pressure change at the controller 6 with the result that only damping forces will develop at the left actuator. Of course when both wheels move, equal force changes occur at the two corners. The damper valves at 5 and 19 serve for both vertical and angular modes of the sprung and unsprung masses S and U.

The controller 6 can be contrived to respond rapidly both to changes in pressure from the accumulator spring 4 by the feedback piston 7 and to lateral accelerations of the vehicle through the pendulum 10. Times of response less than 0.02 second are feasible even with pendulums having high moment of inertia. The sensitivity to lateral accelerations may be chosen for flat cornering or some banking of the body. With zero banking the angular velocity of the body is zero and no power for this function is required. Also, the wheels of independent suspensions remain vertical on turns with resulting better tire life.

The standby power loss because of the steady flow of fluid at the controller and the integral leveling system is in the range of $\frac{1}{2}$ horsepower. The other losses at the damper valves 5 and 19 of course correspond to that of existing shock absorbers and vary with road conditions and may be several horsepower at times.

Figure 4:
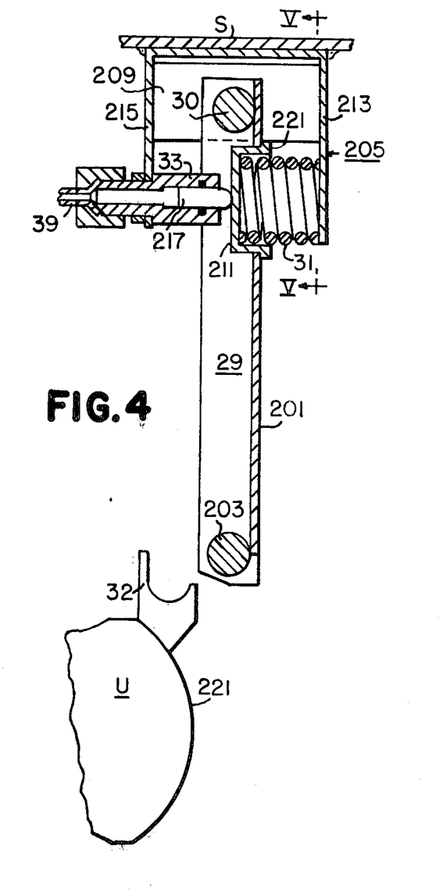
FIG. 4 is a view in longitudinal section showing the lockup in accordance with this invention for preventing body sag.
Figure 5:
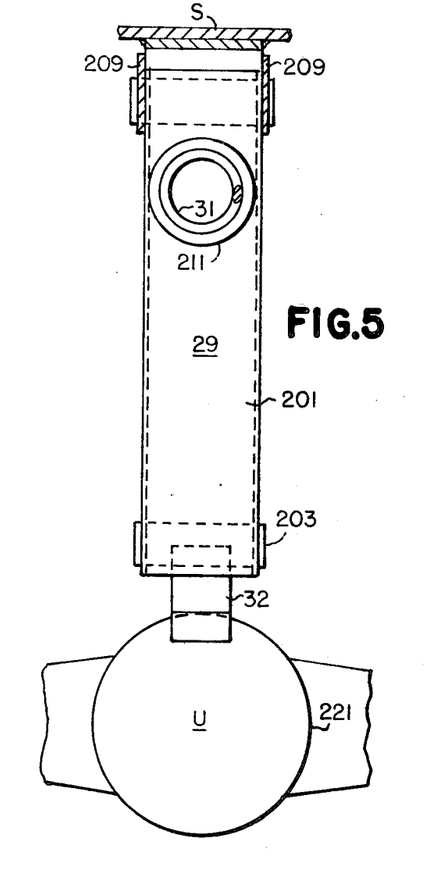
FIG. 5 is a view partly in section taken along V—V of FIG. 4 and partly in side elevation of the lockup shown in FIG. 4.

Gradual leakage of fluid back to the sump 38 causes actuators 1 and 9 to collapse when the hydraulic power source is idle. In FIGS. 3, 4, 5 the mechanical lockup 29 for preventing sag of the body S is shown. With some hydropneumatic suspensions, it is feasible to employ hydraulic valves to trap fluid within the actuators for providing support for the body S when the power source is idle. In the present apparatus this would require packing glands for both actuators to be subject to high pressure, with one gland of the actuator 1 located in the piston. Because it is desirable to keep the mechanical friction very low, it is best to prevent high pressure from being applied to any packing gland. In the apparatus according to this invention, the packing for both actuators is relieved by low pressure returns at grooves 27 and 29 (FIG. 2).

In the mechanical lockup 29 the channel member 201 pivoted at 30 on the sprung mass is actuated by spring 31 into engagement with the unsprung mass at tab 32 and disengaged by the piston 217 of the small hydraulic cylinder 33 when pressurized. The entire functioning is made automatic by a novel hydraulic circuit. For this purpose the power source includes the pump 34 which charges accumulator 35 through the check valve 36 so that when the pump is stopped, the pressure ahead of the check valve at 39 drops very rapidly by the bleeding of fluid through the orifice 37 to the sump 38. This is the pressure which is applied to the small cylinder 33 when the pump is active. The engaging spring 31 quickly moves the piston and the lockup 29 to give support to the body when the engine-driven pump stops. In like manner when the pump starts, the piston 217 of cylinder 33 releases the lockup 29 as the power source supplies pressure to the hydropneumatic system for support of the body.

Figure 6:
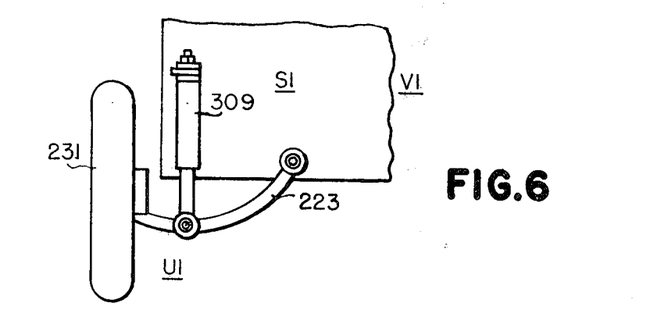
FIG. 6 is a fragmental view in rear elevation of a vehicle showing the manner in which this invention is applied to a vehicle with independently sprung wheels.

FIG. 6 shows a vehicle VI with independent rear suspension including anti-roll out in accordance with this invention. The wheels 231 of vehicle VI are suspended from the sprung mass S by opposite arms 233 of a wish-bone like bracket. The arms 233 and the wheels 231 constitute the unsprung mass U. The actuator 309, similar to the actuator 9 (FIG. 2), is interposed between the sprung mass S and the arm 233. An actuator (not shown), similar to actuator 1 (FIG. 2), is interposed between the sprung mass S and the arm (not shown) of the wish-bone suspending the opposite wheel (not shown). Lockups (not shown), similar to lockup 29 (FIGS. 3, 4, 5), are cooperative with the suspension of each wheel. The two lockups can be actuated by a common spring, similar to spring 31 and a common cylinder, similar to cylinder 33.

While preferred embodiments of this invention have been disclosed herein, many modifications thereof are feasible. This invention is not to be restricted except to the extent necessitated by the prior art.

I claim:

1. A vehicle having an unsprung mass and a sprung mass resiliently suspended from said unsprung mass by a hydropneumatic suspension including a spring accumulator, the said vehicle including an hydraulic power source, a first hydraulic actuator, connected near one corner of said sprung mass between said sprung mass and said unspring mass, to resiliently suspend said sprung mass near said one corner, said first actuator having a first chamber and a second chamber, said first chamber, when supplied with hydraulic pressure, exerting an upward force on said one corner and said second chamber, when supplied with hydraulic pressure, exerting a downward force on said one corner, a second hydraulic actuator, connected near an opposite corner of said sprung mass between said sprung mass and said unsprung mass, to resiliently suspend said sprung mass near said second corner, said second actuator having a chamber which, when supplied with pressure, exerts an upward force on said opposite corner, a pendular controller including an oscillable pendulum, means suspending said controller from said sprung mass with said pendulum oscillable responsive to movement of said sprung mass, means, connected to said source, for supplying pressure to said accumulator through said controller, means, connected to said source, for supplying pressure to said second chamber and to said chamber of said second actuator through said controller, and means, connected to said accumulator for supplying pressure to said first chamber, the forces produced by said pressure supplied to said second chamber and to said chamber of said second actuator acting as a force couple on said unsprung mass, said pendulous controller including means, responsive to the position of said pendulum as it is influenced by the movement of said sprung mass, for varying the pressure in said second chamber and in said chamber of said second actuator and also in said first chamber to stabilize the position of said sprung mass and to suppress roll of said sprung mass.

2. The vehicle of claim 1 including an additional connection between the source and the first chamber, responsive to the loading of the unsprung mass for varying the pressure in the first chamber in dependence upon said loading.

3. In a hydropneumatic suspension for a vehicle having sprung and unsprung masses, a source of hydraulic power, a spring accumulator, a connection between said source and said accumulator for supplying pressure to said accumulator, a first and a second hydraulic actuator for one end of said vehicle connected between said sprung and unsprung masses at the two corners, said first actuator having a first fluid chamber for producing upward force on said sprung mass and a second fluid chamber for producing downward forces on said sprung mass, said upward-force chamber being connected hydraulically to said spring accumulator and having pressure for supporting approximately twice the weight of said sprung mass at one corner, said second actuator having a fluid pressure chamber for producing upward forces on said sprung mass at said other corner, a pendulous controller mounted on said sprung mass and connected hydraulically to said power source, said controller including means for determining a fluid pressure having two components, one component being always a constant fraction of said spring accumulator pressure, and the other component being proportional to the lateral acceleration of said sprung mass, said controller pressure being applied to said downward-force chamber of said first actuator and to said chamber of said second actuator to equalize and produce the proper support at said two corners, and to provide anti-roll forces for said sprung mass.

4. The apparatus of claim 3 wherein the connection between the source and the accumulator includes an orifice for feeding fluid to the accumulator from the power source, and a plurality of orifices for discharging fluid from said accumulator to said power source, and means for closing said plurality of orifices in succession by changes in the spacing between said sprung and unsprung masses.

5. In a hydropneumatic suspension for a vehicle having sprung and unsprung masses, a source of hydraulic power, a single-chamber actuator and a dual-chamber actuator for one end of said vehicle connected between said sprung and unsprung masses for producing forces between said masses, a spring accumulator connected hydraulically to one chamber of said dual-chamber actuator and having pressure in excess of that required to support said sprung mass, a pendulous controller mounted on said sprung mass and connected hydraulically to said power source, said controller including means for determining an average pressure which is a constant fraction of said accumulator pressure plus superposed pressure variations which are proportional to the lateral acceleration of said vehicle, said controller pressure being applied to the remaining chamber of said dual-chamber actuator and to the chamber of said single-chamber actuator to produce equal average forces on said sprung mass and force variations to resist roll of said sprung mass.

6. In a hydropneumatic suspension for a vehicle having sprung and unsprung masses, a source of hydraulic power, hydraulic actuators for supporting the sprung mass of said vehicle from said unsprung mass, means for supplying pressure to said actuators from said power source, and positive mechanical means for supporting said sprung mass when said power source is idle, and means connected to said mechanical supporting means for enabling said supporting means when said source is idle and means connected to said mechanical supporting means for disabling said supporting means when said source is operative.

7. The apparatus of claim 6 wherein the enabling means includes spring means for engaging said mechanical supporting means to enable said supporting means and hydraulic-pressure means for counteracting said spring means to disable said supporting means.

8. In a hydropneumatic suspension for a vehicle having sprung and unsprung masses, a source of hydraulic power, a spring accumulator, a plurality of hydraulic actuators for one end of said vehicle connected between said sprung and unsprung masses for providing gravity support and roll resistance for said sprung mass, height-control means for determining said gravity support, pendular-control means for determining said roll resistance, said height-control means and said pendular control means being supplied from said source of hydraulic power, said hydraulic actuators having a total of three working-pressure chambers, only one of said three chambers being connected to said spring accumulator, and two of said chambers being connected to said pendular control means and having no connection to said accumulator.

9. A vehicle having an unsprung mass and a sprung mass resiliently suspended from said unsprung mass by a hydropneumatic suspension including a spring accumulator, the said vehicle including an hydraulic power source, a first hydraulic actuator, connected near one corner of said sprung mass between said sprung mass and said unsprung mass, to resiliently suspend said sprung mass near said one corner, said first actuator having a first chamber and a second chamber, said first chamber, when supplied with hydraulic pressure, exerting an upward force on said one corner and said second chamber, when supplied with hydraulic pressure, exerting a downward force on said one corner, a second hydraulic actuator, connected near an opposite corner of said sprung mass between said sprung mass and said unsprung mass, to resiliently suspend said sprung mass near said second corner, said second actuator having a chamber which, when supplied with pressure, exerts an upward force on said opposite corner, a pendular controller including an oscillable pendulum, means suspending said controller from said sprung mass with said pendulum oscillable responsive to movement of said sprung mass, means, connected to said source, for supplying pressure to said accumulator through said controller, means, connected to said source, for supplying pressure to said second chamber and to said chamber of said second actuator through said controller, and means, connected to said accumulator for supplying pressure to said first chamber, the forces produced by said pressure supplied to said second chamber and to said chamber of said second actuator acting as a force couple on said unsprung mass, said pendulous controller including means, responsive to the position of said pendulum as it is influenced by the movement of said sprung mass, for varying the pressure in said second chamber and in said chamber of said second actuator and also in said first chamber to stabilize the position of said sprung mass and to suppress roll of said sprung mass, the pendulous controller includes a pilot valve and a feedback piston, said pilot valve being responsive to the movement of the pendulum and said feedback piston being responsive to the movement of said pendulum and to the pressure in the spring accumulator whereby the pilot valve is acted upon by the force of said pendulum and by said feedback piston, said pilot valve controlling the magnitude of the pressure supplied to the second chamber and to the chamber of the second actuator.

10. The vehicle of claim 9 wherein the feedback piston is connected to the pendulum and accumulator, to set an average pressure in the chambers and, in cooperation with the pilot valve, produces superimposed variations about said average pressure dependent on the lateral acceleration of the vehicle.

11. A vehicle having an unsprung mass and a sprung mass resiliently suspended from said unsprung mass by a hydropneumatic suspension including a spring accumulator, the said vehicle including an hydraulic power source, a first hydraulic actuator, connected near one corner of said sprung mass between said sprung mass and said unsprung mass, to resiliently suspend said sprung mass neaar said one corner, said first actuator having a first chamber and a second chamber, said first chamber, when supplied with hydraulic pressure, exerting an upward force on said one corner and said second chamber, when supplied with hydraulic pressure, exerting a downward force on said one corner, a second hydraulic actuator, connected near an opposite corner of said sprung mass between said sprung mass and said unsprung mass, to resiliently suspend said sprung mass near said second corner, said second actuator having a chamber which, when supplied with pressure, exerts an upward force on said opposite corner, a pendular controller including an oscillable pendulum, means suspending said controller from said sprung means with said pendulum osillable responsive to movement of said sprung mass, means, connected to said source, for supplying pressure to said accumulator through said controller, means, connected to said source, for supplying pressure to said second chamber and to said chamber of said second actuator through said controller, and means, connected to said accumulator for supplying pressure to said first chamber, the forces produced by said pressure supplied to said second chamber and to said chamber of said second actuator acting as a force couple on said unsprung mass, said pendulous controller including means, responsive to the position of said pendulum aa it is influenced by the movement of said sprung mass, for varying the pressure in said second chamber and in said chamber of said second actuator and also in said first chamber to stabilize the position of said sprung mass and to suppress roll of said sprung mass, said vehicle also including mechanical means suspended from the sprung mass and engageable with and disengageable from the unsprung mass, means, responsive to the disabling of the source, for actuating said mechanical means to engage said unsprung mass so long as said source is disabled to suppress sag of said sprung mass and means, responsive to the enabling of said source, for actuating said mechanical means to disengage said unsprung mass so long as said source remains enabled.

12. A vehicle having an unsprung mass and a sprung mass resiliently suspended from said unsprung mass by a hydropneumatic suspension including a spring accumulator, the said vehicle including an hydraulic power source, a first hydraulic actuator, connected near one corner of said sprung mass between said sprung mass and said unsprung mass, to resiliently suspend said sprung mass near said one corner, said first actuator having a first chamber and a second chamber, said first chamber, when supplied with hydraulic pressure, exerting an upward force on said one corner and said second chamber, when supplied with hydraulic pressure, exerting a downward force on said one corner, a second hydraulic actuator, connected near an opposite corner of said sprung mass between said sprung mass and said unsprung mass, to resiliently suspend said sprung mass near said second corner, said second actuator having only one chamber which, when supplied with pressure, exerts an upward force on said opposite corner, a pendular controller including an oscillable pendulum, means suspending said controller from said sprung mass with said pendulum oscillable responsive to movement of said sprung mass, means, connected to said source, for supplying pressure to said accumulator through said controller, a conductor, connecting said source to said second chamber and to said only chamber of said second actuator but having no connection to said accumulator, for supplying pressure to said second chamber and to said only chamber of said first actuator, and means, connected to said accumulator for supplying pressure to said first chamber, the forces produced by said pressure supplied to said second chamber and to said only chamber of said second actuator acting as a force couple on said unsprung mass, said pendulous controller including means, responsive to the position of said pendulum as it is influenced by the movement of said sprung mass, for varying the pressure in said second chamber and in said only chamber of said second actuator and also in said first chamber to stabilize the position of said sprung mass and to suppress roll of said sprung mass.

13. In a hydropneumatic suspension for a vehicle having sprung and unsprung masses, a source of hydraulic power, a plurality of hydraulic actuators, means connecting said actuators between said sprung and unsprung masses near opposite corners of said vehicle for providing gravity support and roll resistance for said sprung mass, height-control means connected to one of said actuators for determining said gravity support, pendular-control means for determining said roll resistance, said one of said actuators having two oppositely acting working-pressure chambers and the other of said actuators having only one working-pressure chamber, an hydraulic circuit exclusive of said spring accumulator interconnecting said pendular control means, one of the chambers of said one actuator and the only chamber of said other actuator for impressing a force couple resistant to roll on said sprung mass under the control of said pendular control means, another hydraulic circuit including said spring accumulator, said pendular control means and said other chamber of said one actuator, cooperative with said height control means, for stabilizing said sprung mass vertically.

14. In a hydropneumatic suspension for a vehicle having sprung and unsprung masses, a source of hydraulic power, a spring accumulator, a first connection between said source and said accumulator for supplying fluid to apply pressure to said accumulator, said connection including an orifice through which said fluid is fed to said accumulator, an hydraulic actuator interposed between sprung and unsprung masses, responsive to the spacing between said sprung and unsprung masses, a second connection between said actuator, said accumulator, and said source for supplying fluid to said actuator so that said actuator exerts a pressure, dependant on the supply of said fluid, between said sprung and unsprung masses, a third connection, including a plurality of orifices in said actuator, for discharging fluid from said accumulator to said source, and means, responsive to said response of said actuator for closing or opening the orifices of said plurality of orifices in succession in dependence upon the spacing between the sprung and unsprung masses.

* * * * *